UNITED STATES PATENT OFFICE.

LEWIS C. GRANT, OF CLEVELAND, OHIO, AND NELSON B. CHESTER, OF CALDWELL, NEW JERSEY.

PUNCTURE-HEALING COMPOUND.

SPECIFICATION forming part of Letters Patent No. 715,784, dated December 16, 1902.

Application filed August 15, 1902. Serial No. 119,785. (No specimens.)

*To all whom it may concern:*

Be it known that we, LEWIS C. GRANT, residing at Cleveland, in the county of Cuyahoga and State of Ohio, and NELSON B. CHESTER, residing at Caldwell, in the county of Essex and State of New Jersey, citizens of the United States, have invented certain new and useful Improvements in Puncture-Healing Compounds; and we do declare the following to be a full, clear, and exact description of the invention, such as will enable others skilled in the art to which it appertains to make and use the same.

The invention relates to a new and useful improvement in a puncture-healing compound.

The object of the invention is to provide a compound of this character by means of which punctures in pneumatic tires may be easily and quickly repaired and which is adapted to be deposited in the tire and do such repairing or healing automatically without exerting any deleterious effect upon the rubber forming a constituent part of the tire.

Said invention consists of an admixture, by weight, of the following ingredients: granulated cork, two ounces; ground asbestos, nine ounces; ground mica, four ounces, and powdered borax one ounce. The asbestos is ground approximately to the fineness of screen mesh No. 100 and the mica to the fineness of screen mesh No. 60. Slight variations in these proportions do not affect the principle of the invention. By careful experiment these degrees of fineness have been found to produce the best results. When ground coarser than indicated above, difficulty has been experienced in pumping the mixture through the valve-tube. When ground finer, the flakes have a tendency to ooze out through the tire in all but the smallest punctures. We have obviated this by the addition of asbestos, which, being of a fibrous nature, when forced into the puncture forms a sort of rope, which is held firmly by the elastic walls of the rubber tire. The greater the pressure the more firm and rigid is the hold of the rubber upon the asbestos, so that no amount of pressure or rough handling can dislodge it. The mica fills a secondary place, working its way into the interstices and smaller crevices.

We are aware that various sealing mixtures, compositions, and compounds have been devised and more or less successfully used in sealing or healing tire punctures, especially small ones, and therefore we do not wish it to be understood that we consider ourselves the first to invent or produce a compound for the purpose stated; but What we do claim, and desire to secure by Letters Patent of the United States, is—

A compound for the purpose described composed of asbestos, borax, mica and cork, substantially as set forth.

In testimony whereof we have hereunto set our hands in presence of two subscribing witnesses.

LEWIS C. GRANT.
NELSON B. CHESTER.

Witnesses:
HENRY L. YOST,
JOHN H. SCOTT.